April 6, 1965 K. S. JENSON 3,176,605
VENTILATING HOOD
Filed May 17, 1962 2 Sheets-Sheet 1

INVENTOR:
Kenneth S. Jenson
BY Hofgren, Brady,
Wegner, Allen & Stellman
Attys

April 6, 1965  K. S. JENSON  3,176,605
VENTILATING HOOD

Filed May 17, 1962  2 Sheets-Sheet 2

United States Patent Office 3,176,605
Patented Apr. 6, 1965

3,176,605
VENTILATING HOOD
Kenneth S. Jenson, Wisconsin Rapids, Wis., assignor to Preway, Inc., a corporation of Wisconsin
Filed May 17, 1962, Ser. No. 195,516
5 Claims. (Cl. 98—115)

This invention relates to ventilating hoods and more particularly to ventilating hoods for installation in kitchens or the like, particularly over cook stoves, for exhausting such gases as smoke, cooking gases, fumes, vapors and the like from the kitchen.

It is a general object of the invention to provide new and improved apparatus of the character described.

A more particular object of this invention is to provide a new and improved ventilating hood permitting less severe exposure conditions for component parts of the hood, and particularly a motor of the blower unit contained within the hood, by decreasing the severity of exposure of such component parts to hot gases and especially grease-laden hot gases.

Another object is to provide for mixing of hot gases in a ventilating hood with cool air prior to contact with the blower unit motor or other component parts of the hood for which protection against hot gases is desired. Still another object is to protect the motor from the directed flow of gases from an inlet of the hood.

Further objects and advantages will be apparent from the following descriptions.

Briefly, I have provided certain improvements in a ventilating hood having a casing and the blower positioned within the casing in gas communicating proximity to an inlet and an outlet, wherein the blower draws gases, e.g. smoke, cooking gases, and the like, into the hood through the inlet and vents the gases from the hood through the outlet. In accordance herewith, there is provided a cool air intake adjacent the hot gas inlet means and a mixing chamber, positioned upstream from the blower motor, for mixing and diluting the hot gases with cool air. The mixing chamber is in air communication with the hot gas inlet and cool air intake.

In accordance with a particular embodiment of this invention, there is provided a mixing chamber containing a baffle which deflects hot air entering the inlet into mixing association with the cool air entering the intake. As one aspect of this embodiment, heat shield means can be provided downstream from the mixing chamber and positioned to shield the blower motor from the direct flow of gases from the mixing chamber. As another aspect, a filter can be provided between the mixing chamber and blower assembly for filtering greases from the mixture of grease laden-gases and air passing from the mixing chamber to the blower assembly. In a preferred arrangement of the embodiment, the cool air intake is positioned on the top wall of the ventilating hood adjacent the front of the hood and the hot gas inlet is positioned on the bottom wall of the hood below the cool air intake and in substantial alignment therewith. In an advantageous arrangement, the mixing chamber is separable from the blower assembly but is advantageously associable with the blower assembly to form a ventilating hood.

It is a feature of the present ventilating hood that it is adaptable for installation with kitchen cabinetry over a cooking surface. In accordance wih a preferred adaptation utilizing the cool air intake on the top front portion of the vent and the hot gas inlet aligned therebelow, the ventilating hood can be mounted by hanging from wall cabinets with the front portion of the hood protuding beyond such cabinets, permitting free flow of cool air into the top front portion of the hood for mixing with hot cooking gases entering the inlet within the protrusion beyond the cabinets. Such embodiment and installation permits drawing cool air from above the hood for use in cooling the cooking gases and also permits mounting the hood over a cooking unit which includes an oven above the cooking surface.

Other features and embodiments which are provided in the construction of the hood, in the placement of the motor switch in a cool portion of the hood, etc., will be apparent from the description and drawings.

In the drawings, FIG. 1 illustrates the ventilating hood positioned over a cooking surface and oven and under an overhead wall cabinet unit;

Figure 1:
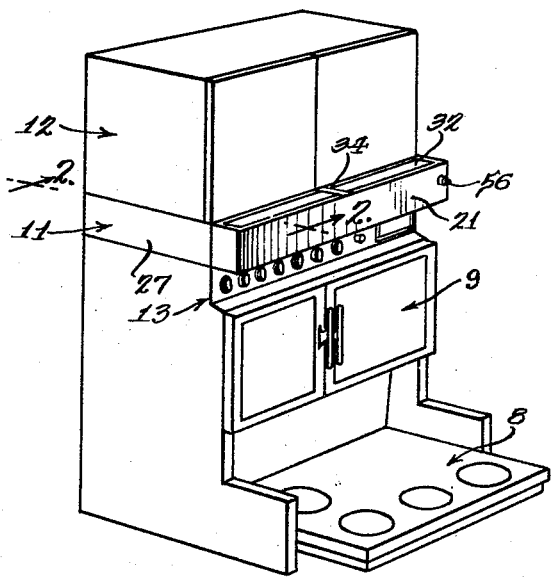
Figure 2:
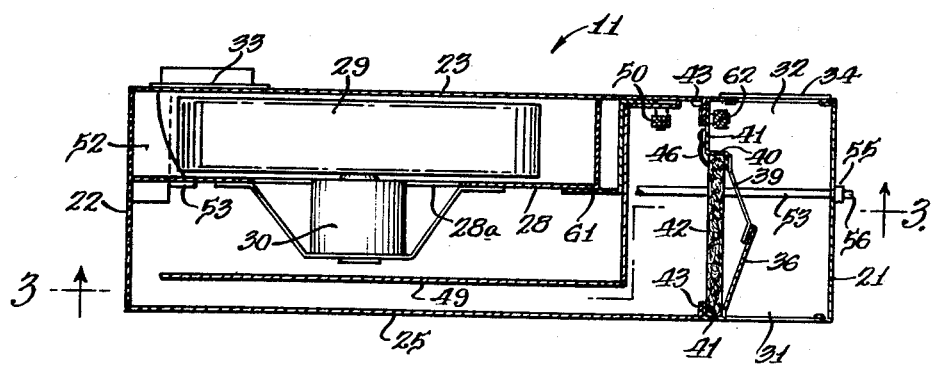
FIG. 2 is a vertical section through the hood along the line 2—2 of FIG. 1.
Figure 3:
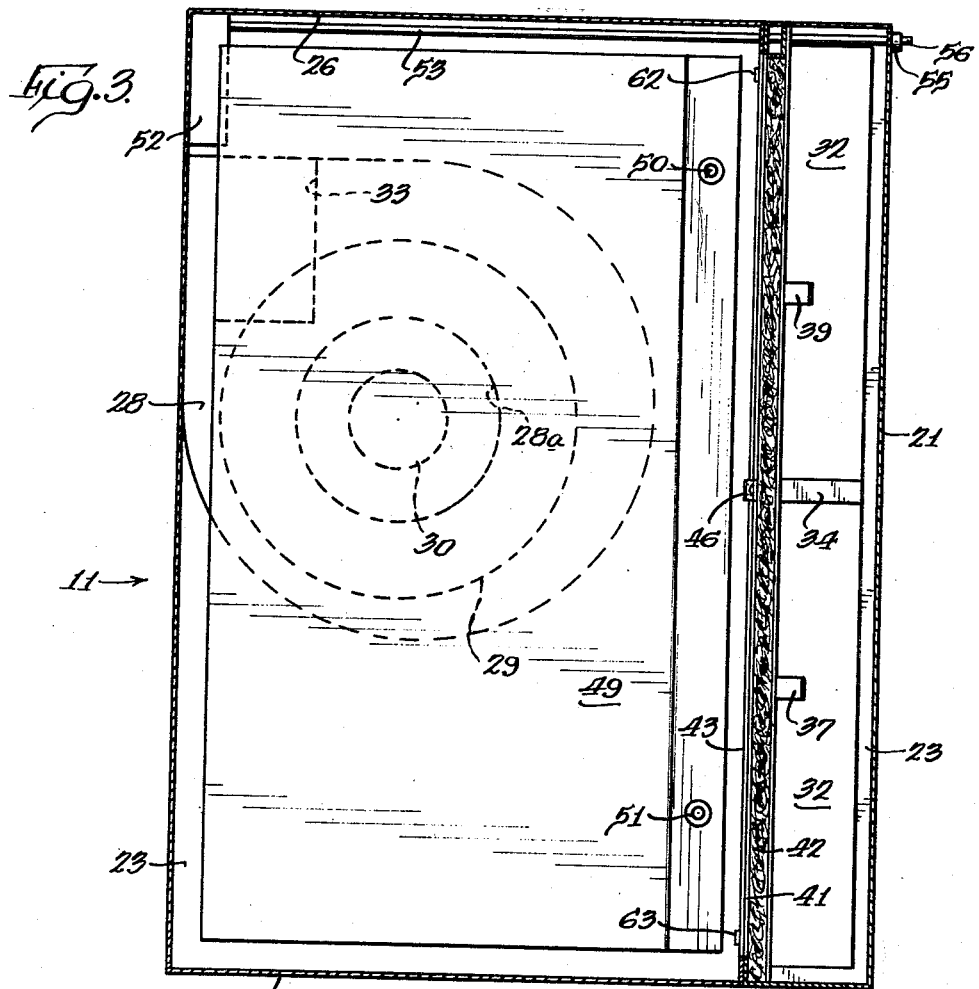
FIG. 3 is a horizontal section taken on the offset line 3—3 in FIG. 2, with a view toward the top wall of the vent.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, a ventilating hood, indicated generally at 11, is mounted beneath a wall cabinet 12 against wall 13. The hood is designed to overlie an oven section 9 superjacent a cooking surface 8 in a kitchen and draw air into the hood to thus carry grease, smoke and heat away from the cooking area. Hood 11 has a casing with a top wall 23, a bottom wall 25, a back wall 22, side walls 26 and 27 and a front wall or panel 21. The front panel 21 has a suitable control 56 for operating motor 30 of the blower unit. Electrical power is supplied to the hood through an aperture in casing top wall 23 adjacent switch 52. Motor 30 is in an electrical circuit with switch 52 in the usual manner through conventional electrical wiring (not shown).

The blower unit, supported within hood 11, comprises blower housing 28, motor 30 mounted to housing 28 by suitable brackets and blower 29. Blower 29 is a conventional vane type blower carried within housing 28 and mounted to the motor shaft of motor 30. Housing 28 is provided with an opening 28a permitting passage of gases into the blower housing.

Hot gas inlet port 31 is provided in bottom wall 25 and an outlet port 33 is provided in top wall 23. Additionally, a cool air intake port 32 is provided in top wall 23 in alignment with inlet port 31. Brace 34 supports the middle of panel 21 by attachment across port 32.

A mixing chamber is provided between inlet port 31 and intake port 32 and is defined by these ports and front panel 21. Baffle 36 projects into the mixing chamber at an angle sufficient to promote substantial mixing of hot gases entering through port 31 with cool air entering through intake port 32. Baffle 36 is supported by metal strips 37 and 39 extending to flange 40. Filter 42, of a material normally used in ventilating hoods for filtering grease-laden gases, is removably mounted between baffle 36 and flange 41 at the bottom and is held in position against flange 40 by clip 46 which is pivotally attached to the top portion of flange 41 and protrudes over filter 42. For removal of the filter, clip 46 is pivoted, e.g. approximately 90 degrees or more, and the filter can be withdrawn in a rearward direction, i.e. toward the rear of the hood.

Flange 43 abuts flange 41 and is releasably secured thereto through triangular plate 64 (FIGURE 4) by threaded stub shaft and thumb nut assembly 62.

Threaded stub shaft and thumb nut assembly 63 and a similar triangular plate are also provided for the purpose of removably securing flanges 41 and 43. The triangular plates are secured by welding to the rearward side of flange 43.

To the rear of the mixing chamber, heat shield 49, a galvanized steel sheet, is provided. The heat shield may be of any heat absorbent and/or heat reflective material. Heat shield 49 is attached to wall 23 by bolt and nut assemblies 50 and 51. The heat shield extends substantially across the flow area adjacent the blower motor 30.

Blower housing 28 is secured by flange 61 to wall 34. Another flange, not shown, secures housing 28 to rear wall 22.

Switch 52 is mounted in a relatively cool area within the hood adjacent the rear wall. Switch 52 is controlled from front panel 21 by means of extension rod 53 extending from switch 52 through the hood and slidably carried in grommet or sleeve 55 secured through panel 21. The slidable fit of rod 53 in sleeve 55 permits ease of operation of the switch from the front panel. The front end of rod 53 protrudes from the front of the panel 21 and is designated control button 56.

Figure 4:
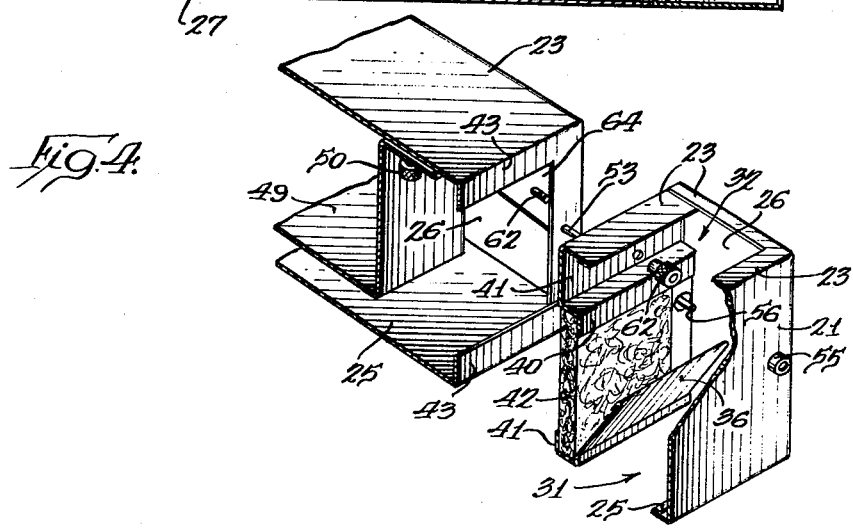
FIG. 4 is a fragmentary perspective view of the hood disassembled at the juncture of two casings, showing two piece construction of the illustrated hood.

The illustrated hood is constructed in two major parts. A front casing and rear casing are releasably joined by the threaded shaft and nut assemblies 62 and 63. The rear casing is defined by rear wall 22, the rear portions of walls 23, 25, 26 and 27 and flange 43 projecting from walls 23, 25, 26 and 27 adjacent the plane of juncture of the two casings. The front casing is defined by panel 21, the front portion of walls 26 and 27, the front portion of walls 23 and 25 illustrated as flanges defining the edges of inlet 31 and intake 32 respectively, and flange 41 projecting from walls 23, 25, 26 and 27 adjacent the plane of juncture with the rear casing. The rear casing contains blower 29, motor 30, housing 28, switch 52, heat shield 49 and appropriate securing members described hereinabove and is provided with outlet 33. The front casing contains intake 32, inlet 31, baffle 36, filter 42 and appropriate supports and braces and the cavity within the front casing substantially corresponds to the mixing chamber 35. In FIG. 4, rod 53 extends from switch 52 through flanges 43, 41 and 40 and is sufficiently elongated so that when the two casings are secured by nut and bolt assemblies 62 and 63, the end of rod 53 projects through sleeve 55 as button 56.

In operation, control button 56 actuates switch 52, activating activating motor 30. The blower unit draws hot gases in through inlet port 31 and cool air in through intake port 32. The cool air and hot gases are mixed in the mixing chamber, pass through filter 42 and around heat shield 49. The mixture of gases is thence drawn through opening 28a and exhausted through outlet 33.

It is apparent from the foregoing that I have provided a ventilating apparatus which utilizes a mixing chamber for mixing hot gases with cool air and serves to lessen the severity of such hot gases on such heat sensitive components as the blower motor.

I claim:

1. A ventilating hood comprising, a casing having walls including a top wall, a bottom wall, and a front wall, a motor-driven blower positioned within the casing for rotation about a vertical axis, a motor positioned in the casing beneath the blower, an exhaust port in one of said walls in fluid communication with said blower, means located between said blower and the front wall defining an opening extending between said top and bottom walls and across substantially the entire width of the casing, means positioned in said opening from removing grease from grease-laden hot air prior to flow of said air to said blower, means in said bottom wall adjacent the front wall defining an inlet port to said casing and extending substantially across the width of the casing, means in said top wall adjacent the front wall and extending substantially across the width of the casing defining an intake port to said casing for cool air, and means located in said casing between said inlet and intake ports for causing mixing of cool and hot air prior to passage thereof to the blower.

2. A ventilating hood as defined in claim 1 in which means defining a heat shield is positioned within the casing between said motor-driven blower and said grease removing means to block direct flow of air against said motor-driven blower.

3. A ventilating hood as defined in claim 1 in which switch means for said motor-driven blower are positioned at a location remote from said front wall, and manually-operable link means extending from said front wall to the switch means for operation thereof.

4. A ventilating hood as defined in claim 1 in which said air mixing means comprises a baffle plate having a length to extend for substantially the entire width of the casing and mounted to said casing bottom wall adjacent said grease-removing means and sloping upwardly toward said intake port and casing front wall to block hot air from direct movement from the inlet port to said grease-removing means.

5. A ventilating hood which comprises a casing having walls including top, bottom and rear walls, an exhaust blower having an electric motor and secured within the casing, an exhaust port through one of said walls of the casing and in flow communication with the exhaust blower, an inlet port in the bottom wall of the casing at the front end of the bottom wall for receiving fumes from a stove and in flow communication with the exhaust blower, a cool air intake port in the front end of the top wall of the casing and opposite the inlet port, filter means for removing grease from grease-laden hot gases and mounted within said casing between the exhaust blower and the inlet port, a baffle secured within said casing and angularly positioned within the normal flow of air from said inlet port to deflect gas from said inlet port away from said filter means and into gas mixing proximity to the cool air intake port, a plurality of said casing walls defining a conduit from said filter means to said exhaust port, said blower being within said conduit, a heat shield secured within the casing upstream from the blower and positioned partially across said conduit between the filter means and blower and adapted to divert flow of gas away from the blower motor, operable switch means for activating and deactivating the blower motor, said switch being positioned at the rear wall of the casing, and manually operable link means for operating said switch from the front wall of the casing to cause the exhaust blower to draw grease-laden hot gas from the inlet port and cool air from the intake port wherein the grease-laden hot gas is cooled by mixing with cool air, through the filter for filtering of grease from the air-gas mixture, around the heat shield and through the blower for exhausting the mixture from the outlet port.

References Cited by the Examiner

UNITED STATES PATENTS

| | | | |
|---|---|---|---|
| 1,671,524 | 5/28 | Gerdes | 98—115 |
| 2,836,114 | 5/58 | Weaver | 98—115 |
| 3,064,551 | 11/62 | Stalker | 98—115 |

ROBERT A. O'LEARY, *Primary Examiner.*